United States Patent
Chen et al.

(10) Patent No.: US 8,422,824 B2
(45) Date of Patent: Apr. 16, 2013

(54) IMAGE TRANSFORMATION METHOD DEVICE FOR OBTAINING A THREE DIMENSIONAL IMAGE

(75) Inventors: Chien-Hung Chen, Taipei County (TW); Meng-Chao Kao, Taipei (TW); Hsiang-Tan Lin, Keelung (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 833 days.

(21) Appl. No.: 12/548,431

(22) Filed: Aug. 27, 2009

(65) Prior Publication Data

US 2010/0322535 A1 Dec. 23, 2010

(30) Foreign Application Priority Data

Jun. 22, 2009 (TW) ................................ 98120873 A

(51) Int. Cl.
*G06K 9/36* (2006.01)
*G06K 9/00* (2006.01)
(52) U.S. Cl.
USPC ............................ 382/285; 382/276; 382/154
(58) Field of Classification Search .................. 382/103, 382/104, 154, 276, 277, 278, 291, 298, 299, 382/285, 300; 345/418, 419
See application file for complete search history.

(56) References Cited

U.S. PATENT DOCUMENTS

| | | | | |
|---|---|---|---|---|
| 4,157,259 A * | 6/1979 | Goffe | | 430/19 |
| 5,764,786 A * | 6/1998 | Kuwashima et al. | | 382/107 |
| 5,825,997 A * | 10/1998 | Yamada et al. | | 345/419 |
| 6,038,031 A * | 3/2000 | Murphy | | 382/254 |
| 6,215,494 B1 * | 4/2001 | Teo | | 345/418 |
| 6,256,036 B1 * | 7/2001 | Matsumoto | | 345/419 |
| 6,580,821 B1 * | 6/2003 | Roy | | 382/154 |
| 6,760,488 B1 * | 7/2004 | Moura et al. | | 382/285 |
| 6,777,659 B1 * | 8/2004 | Schwarte | | 250/208.1 |
| 6,819,318 B1 * | 11/2004 | Geng | | 345/420 |
| 6,914,600 B2 * | 7/2005 | Malzbender et al. | | 345/424 |
| 7,120,519 B2 * | 10/2006 | Okabayashi et al. | | 700/254 |
| 7,263,209 B2 * | 8/2007 | Camus et al. | | 382/104 |
| 7,423,666 B2 * | 9/2008 | Sakakibara et al. | | 348/136 |

(Continued)

FOREIGN PATENT DOCUMENTS

| | | |
|---|---|---|
| JP | 2004-201004 | 7/2004 |
| TW | I233574 | 6/2005 |
| TW | 200816800 | 4/2008 |

OTHER PUBLICATIONS

Tomasi et al. "Shape and Motion from Image Streams under Orthography . . . " Intl Journal of Computer Vision pp. 1-18.*

(Continued)

*Primary Examiner* — Chan S Park
*Assistant Examiner* — Mia M Thomas
(74) *Attorney, Agent, or Firm* — Jianq Chyun IP Office

(57) ABSTRACT

An image transformation method for use in a computer program product and an image display device is provided. In the image transformation method, a two dimensional image and a corresponding depth image are acquired first. A motion process is performed on the two dimensional image to obtain a plurality of motion images according to the depth image and a plurality of gain values. Then, a plurality of view images are provided and an interpolation process is performed on each motion image to obtain the corresponding view image. Finally, a synthesis process is performed on the view images to obtain a three dimensional image.

7 Claims, 17 Drawing Sheets

U.S. PATENT DOCUMENTS

| | | | |
|---|---|---|---|
| 7,616,885 B2 * | 11/2009 | Chen et al. | 396/324 |
| 8,116,558 B2 * | 2/2012 | Hayashi et al. | 382/154 |
| 8,121,399 B2 * | 2/2012 | Hayashi et al. | 382/154 |
| 2005/0068317 A1 * | 3/2005 | Amakai | 345/419 |
| 2008/0239144 A1 * | 10/2008 | Tanase et al. | 348/441 |
| 2009/0086092 A1 * | 4/2009 | Oishi | 348/448 |
| 2011/0153362 A1 * | 6/2011 | Valin et al. | 705/3 |
| 2011/0188708 A1 * | 8/2011 | Ahn et al. | 382/106 |
| 2012/0134536 A1 * | 5/2012 | Myokan | 382/103 |
| 2013/0027391 A1 * | 1/2013 | Lin et al. | 345/419 |

OTHER PUBLICATIONS

"Office Action of Taiwan counterpart application" issued on Dec. 24, 2012, p. 1-p. 8.

* cited by examiner

IMAGE TRANSFORMATION METHOD DEVICE FOR OBTAINING A THREE DIMENSIONAL IMAGE

CROSS-REFERENCE TO RELATED APPLICATION

This application claims the priority benefit of Taiwan application serial no. 98120873, filed Jun. 22, 2009. The entirety of the above-mentioned patent application is hereby incorporated by reference herein and made a part of specification.

BACKGROUND OF THE INVENTION

1. Field of the Invention

The present invention relates to an image transformation method and more particularly to a method for obtaining a three dimensional (3D) image using a two dimensional (2D) image and a corresponding depth image.

2. Description of Related Art

In a 3D image display, a barrier and a view design is often used in combination with binocular parallax to enable the human eyes to sense a 3D image. FIG. 1 illustrates a structural view of a 3D image display adopting two view images. Referring to FIG. 1, a liquid crystal display (LCD) panel 104 has a plurality of pixels V11~V15 and V21~V24 disposed thereon, wherein the pixels V11~V15 comprise a first view image and the pixels V21~V24 comprise a second view image. In addition, a backlight module 103 is disposed at a side of the LCD panel 104 and a barrier 105 is disposed at the other side of the LCD panel 104, wherein the barrier 105 is used to perform a spectrometric process. According to the above, a left eye 101 sees the pixels V11~V15 used to form the first view image through the barrier 105 and a right eye 102 sees the pixels V21~V24 used to form the second view image through the barrier 105, which accordingly, allows the human eyes to feel a 3D image by binocular parallax.

In a conventional process of making a 3D image, images or view suitable for the left and the right eyes are read from a memory and the two images are processed and outputted. However, such method requires a significant amount of memory space and consumes more resources. Furthermore, the afore-mentioned images usually undergo a motion process such that the images have holes in part of the pixels. The conventional technology solves the problem of pixel holes by using copy interpolation to interpolate the pixel holes, which, however, generates less smooth and less natural images.

SUMMARY OF THE INVENTION

An exemplary embodiment of the present invention provides an image transformation method in which a 3D image is obtained according to a 2D image and a corresponding depth image.

An exemplary embodiment of the present invention provides an image transformation method adapted to an image display device. The image transformation method includes obtaining a 2D image and a corresponding depth image. According to the depth image and N gain values $GM_W$, a motion process is performed on the 2D image to obtain N motion images, wherein a pixel motion value of each of the motion images varies with the corresponding gain value $GM_W$, wherein N and w are positive integers and $1 \leq w \leq N$. A plurality of corresponding view images are obtained by respectively performing an interpolation process on the motion images. A synthesis process is performed on the view images to obtain a 3D image.

In one exemplary embodiment of the present invention, the afore-mentioned motion process calculates the pixel motion value in the motion images with the following formula:
$S_w(i,j)=(D(i,j)/a)*GM_w$, wherein $Sw(i,j)$ represents the pixel motion value of the $w^{th}$ motion image, $(i,j)$ represents coordinates of a pixel at the $i^{th}$ column and $j^{th}$ row in the $w^{th}$ motion image, $D(i,j)$ represents a pixel value of the depth image, a is a constant, and i and j are positive integers.

In one exemplary embodiment of the present invention, the afore-mentioned constant a is an integer greater than 0.

In one exemplary embodiment of the present invention, the afore-mentioned plurality of motion images are obtained by moving pixel positions in the 2D image according to the corresponding pixel motion value $Sw(i,j)$.

In one exemplary embodiment of the present invention, the afore-mentioned pixel motion value $Sw(i,j)$ represents an amount of motion of the pixel to the left or the right.

In one exemplary embodiment of the present invention, the above-mentioned step of respectively performing the interpolation process on the motion images to obtain a plurality of corresponding view images includes selecting an average of a plurality of pixels adjacent to the pixel hole to interpolate the pixel hole according to a pixel motion direction of each motion image.

In one exemplary embodiment of the present invention, the above-mentioned step of respectively performing the interpolation process on the motion images to obtain a plurality of corresponding view images includes selecting a median of a plurality of pixels adjacent to the pixel hole to interpolate the pixel hole according to a pixel motion direction of each motion image.

In one exemplary embodiment of the present invention, the above-mentioned step of performing a synthesis process on the view images to obtain a 3D image includes displaying the view images on the display device according to the pixel positions corresponding to the view images.

In one exemplary embodiment of the present invention, a computer program product is provided which when loaded in a computer executes the following steps. A 2D image and a corresponding depth image are obtained. According to the depth image and N gain values $GM_W$, a motion process is performed on the 2D image to obtain N motion images, wherein a pixel motion value of each of the motion images varies with the corresponding gain value $GM_W$, wherein N and w are positive integers and $1 \leq w \leq N$. A plurality of corresponding view images are obtained by respectively performing an interpolation process on the motion images. A synthesis process is performed on the view images to obtain a 3D image.

According to the above, the present invention provides an image transformation method in which a 3D image is obtained according to a 2D image and a corresponding depth image. In addition to obtaining a plurality of smooth and natural view images which are synthesized as a 3D image, the present invention also conserves memory usage. The image transformation method of the present invention is applicable for image display devices, computer accessible recording media, computer program products, or embedded systems.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 5A to FIG. 5B are schematic views illustrating an interpolation process of an image transformation method according to one embodiment of the present invention.

DESCRIPTION OF EMBODIMENTS

Figure 2:
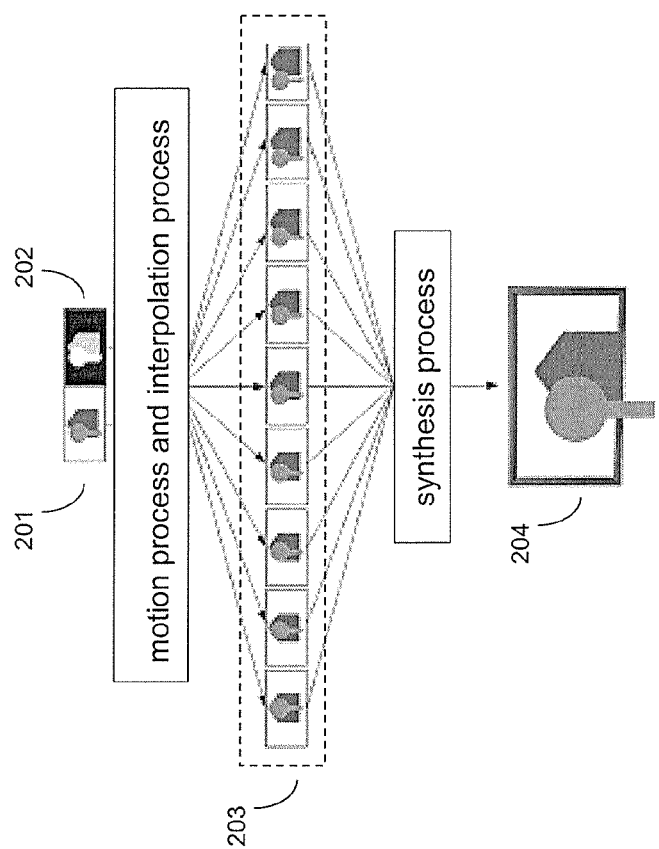
FIG. 2 is a schematic view of an image transformation method according to one embodiment of the present invention.

FIG. 2 is a schematic view of an image transformation method according to one embodiment of the present invention. Referring to FIG. 2, a plurality of view images 203 are obtained after a motion process and an interpolation process are performed on a 2D image 201 and a corresponding depth image 202. Each view image of the view images 203 has different pixel shift as compared to the 2D image 201. Furthermore, the images of the view images 203 are synthesized to provide a 3D image 204 to a display panel.

Figure 1:
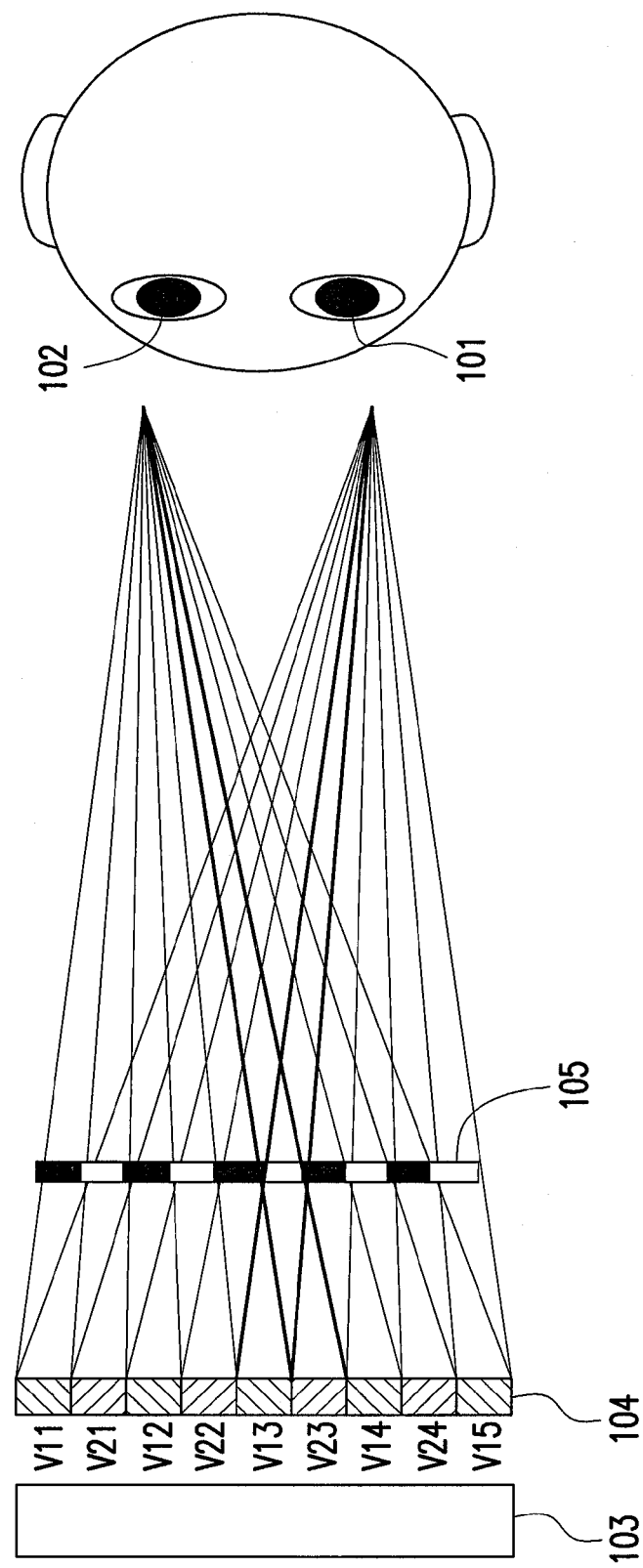
FIG. 1 illustrates a structural view of a 3D image display adopting two view images.
Figure 3:
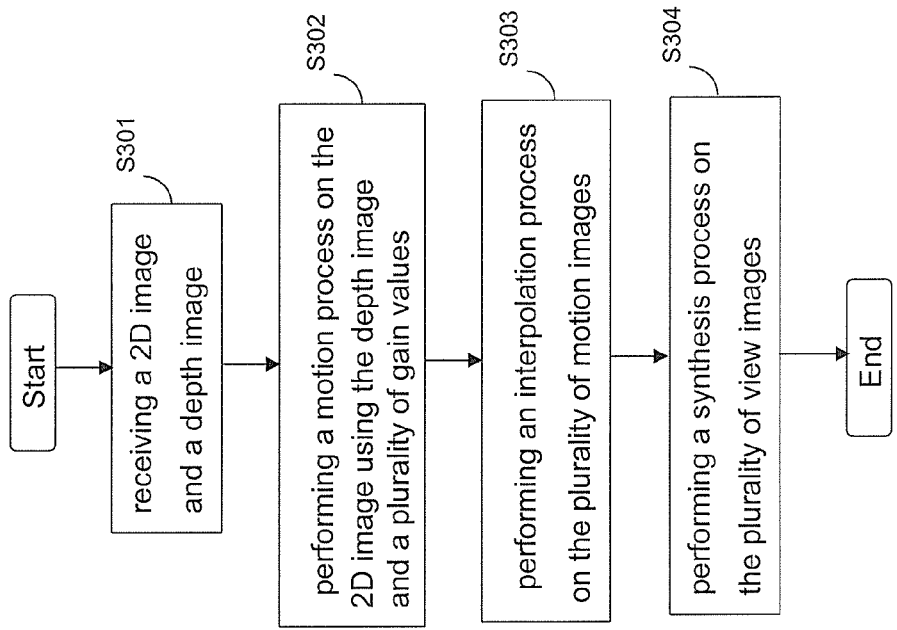
FIG. 3 is a flow chart of an image transformation method according to one embodiment of the present invention.

FIG. 3 is a flow chart of an image transformation method according to one embodiment of the present invention. Referring to FIG. 3, a 2D image and a depth image are first received (step S301). By using the depth image and a plurality of gain values, a motion process is performed on the 2D image to obtain a plurality of motion images (step S302). Subsequently, a plurality of corresponding view images are obtained by respectively performing an interpolation process on the motion images (step S303). Finally, a synthesis process is performed on the view images to obtain a 3D image (step S304). Furthermore, the image transformation method of the present embodiment is applicable for an image display device, wherein the image display device displays the 3D image after the synthesis process. The image transformation method of the present embodiment is also applicable for a computer accessible recording medium, wherein the computer accessible recording medium is used to store programs which implement the image transformation method of the present embodiment. On the other hand, the image transformation method of the present embodiment is also further applicable for a computer program product which when loaded in a computer executes the image transformation method of the present embodiment. In addition, the image transformation method of the present embodiment is also applicable for an embedded system, wherein the embedded system includes a processor which executes program codes to implement the image transformation method of the present embodiment and a memory which stores the program codes to implement the image transformation method of the present embodiment. The above descriptions are given for the purpose of exemplifying the devices for implementing the image transformation method of the present embodiment and are not intended to limit the implementation methods thereto.

Figure 4B:
FIG. 4A to FIG. 4G are schematic views showing the results of an image transformation method adopting two view images according to one embodiment of the present invention.
Figure 4A:

FIG. 4A to FIG. 4G are schematic views showing the results of an image transformation method adopting two view images according to one embodiment of the present invention. FIG. 4A illustrates a 2D image 401 received in step S301 and FIG. 4B shows a depth image 402 received in step S301, wherein the depth image 402 has depth information of objects in the 2D image 401. For example, the people objects in the 2D image 401 have lower depth and the background has higher depth. Moreover, the depth image 402 may comprise a plurality of depth values D(i,j), wherein i and j indicate the pixel coordinates in the depth image 402 of the depth value D(i,j), i and j being positive integers. In addition, the depth value D(i,j) is a gray value. In other words, the depth value D(i,j) is a positive integer and $0 \leq D(i,j) \leq 255$.

In step S302, using the depth image and the N gain values $GM_w$, the motion process is performed on the 2D image to obtain the N motion images, wherein the pixel motion value of the N motion images varies with the corresponding gain value $GM_w$, wherein N and w are positive integers and $1 \leq w \leq N$. In detail, $S_w(i,j)$ represents the pixel motion value of the pixel at the $i^{th}$ column and $j^{th}$ row in the $w^{th}$ motion image. Furthermore, $p(i,j)$ and $m_w(i,j)$ respectively represent the pixel values of the pixels at the $i^{th}$ column and $j^{th}$ row of the 2D image 401 and the first motion image 403, (i,j) are corresponding coordinates, and w=1 and i and j are positive integers. As such, a motion process is performed on the pixel value $p(i,j)$ according to the pixel motion value $S_w(i,j)$ to obtain the pixel value $m_w(i,j)$, wherein the pixel motion value $S_w(i,j)$ varies with the gain value $GM_w$. In other words, the N motion images are obtained by moving pixel positions in the 2D image according to the corresponding pixel motion value $S_w(i,j)$. For example, in order to obtain the first motion image 403, assume the pixel motion value $S_1(11,12)=2$ ($S_1(11,12)$ corresponds to the pixel value $p(11,12)$) and then the pixel value $p(11,12)$ is shifted to right by two pixels. That is to say, after the motion process, the pixel value $m_1(13,12)$ is the pixel value $p(11,12)$. Furthermore, if right shift direction is adopted as the pixel motion direction, then $m_w(i+S_w(i,j),j)=p(i,j)$, i.e. the pixel motion value $S_w(i,j)$ represents the pixel motion value to the right.

Furthermore, the pixel motion value $S_w(i,j)$ is obtained according to the depth image 402 and the gain value $GM_w$, wherein $S_w(i,j)=(D(i,j)/a)*GM_w$, the constant a and the gain value $GM_w$ may be obtained based on design experience. For example, the embodiment illustrated in FIG. 4A to FIG. 4G adopts two view images. Therefore, w=1, 2. In addition, assume the constant a=1, $GM_1=2$, and $GM_2=4$. According to the above, the motion process is performed on the 2D image 401 according to the depth value D(i,j) of the depth image 402 and the gain value $GM_1$, i.e. according to the pixel motion value $S_1(i,j)=(D(i,j)/a)*GM_1$, to obtain the first motion image 403. In addition, since $GM_1=2$, the pixel motion value $S_1(i,j)$ of the first motion image 403 is a multiple of 2. In other words, each pixel value p(i,j) in the 2D image 401 moves by multiples of 2 to obtain the first motion image 403 and the distance of the motion position is related to the depth value D(i,j).

Figure 4D:
Figure 4C:
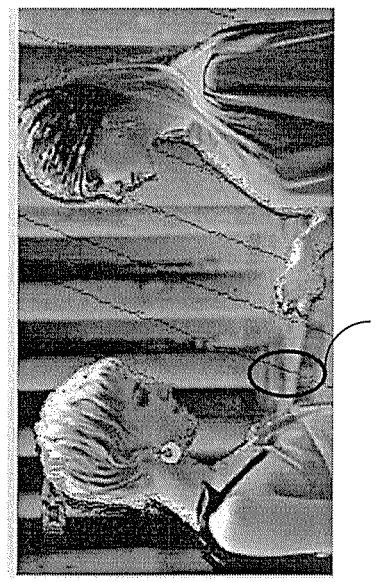
Figure 4F:
Figure 4E:
Figure 4G:

On the other hand, the motion process is performed on the 2D image 401 according to the depth value D(i,j) and the gain value $GM_2$, i.e. according to the pixel motion value $S_2(i,j)=(D(i,j)/a)*GM_2$, to obtain the second motion image 405 in FIG. 4E. In addition, since $GM_2=4$, the pixel motion value $S_2(i,j)$ of the second motion image 405 is a multiple of 4. In other words, each pixel value p(i,j) in the 2D image 401 moves by multiples of 4 to obtain the second motion image 405 and the distance of the motion position is related to the depth value D(i,j). To carry it further, the above-mentioned pixel motion value $S_w(i,j)$ may be implemented by way of scale or vector. Directions of the pixel motion value $S_w(i,j)$ may be right shift, left shift, up shift, down shift, vector shift, or any combination of the aforesaid pixel motion directions. For example, if a left shift pixel motion direction is adopted, then $m_w(i-S_w(i,j),j)=p(i,j)$.

The constant a is used to quantify the depth value D(i,j). For example, the constant a may be a positive integer greater than 0. Assume the depth value D(i,j) is a gray value of a positive integer, $0 \leq D(i,j) \leq 255$, and a=64, then $0 \leq D(i,j)/a < 4$. Furthermore, assume D(i,j)/a is truncated, the result of truncating D(i,j)/a is a positive integer greater than or equal to 0 and smaller than or equal to 4. According to the above, the constant a may be used to adjust motion distance of the pixel motion value $S_w(i,j)$.

The motion images after the motion process may have pixel holes. For example, the first motion image 403 may have a pixel hole 410, i.e. the diagonal lines in the first motion image 403. Similarly, the diagonal lines in the second motion image 405 are also pixel holes. Specifically, in the motion process in step S302, not all pixel values of the first motion image 403 are obtained through the pixel motion value $S_w(i,j)$ of the 2D image 401. In other words, pixel values at some positions in the first motion image 403 are not defined and the positions of these undefined pixel values are pixel holes. To interpolate the pixel holes, in step S303, a plurality of corresponding view images are obtained by performing an interpolation process on the motion images.

Figures 5A, 5B:
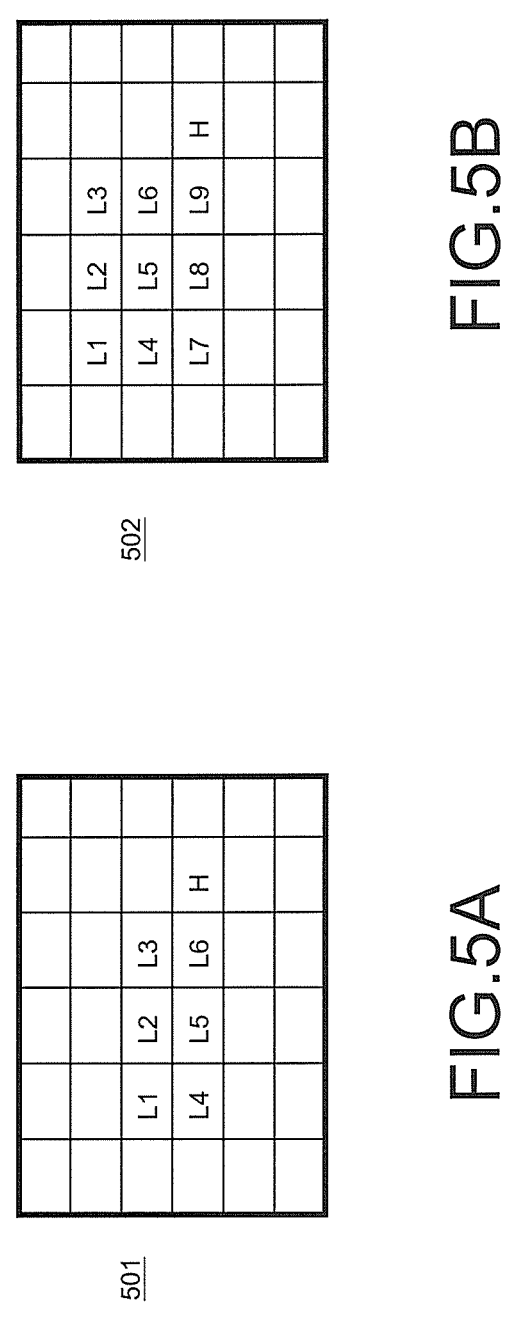

FIG. 5A to FIG. 5B are schematic views illustrating an interpolation process of an image transformation method according to one embodiment of the present invention. Referring to FIG. 5A, a partial block 501 of the motion image includes a plurality of pixel values L1~L6 and a pixel hole H. To interpolate the pixel hole H, an interpolation method adopted in the present embodiment may be an average interpolation or a median interpolation. In detail, assume the direction of the above-mentioned motion process adopts right shift. The interpolation may be performed by using a plurality of pixel values (e.g. pixel values L1~L6 in FIG. 5A) located to the left of the pixel hole H and in the proximity of the pixel hole H. In the average interpolation, the pixel value of the pixel hole H is an average of the pixel values L1~L6 while in the median interpolation, the pixel value of the pixel hole H is a median of the pixel values L1~L6. Furthermore, the interpolation process may select a plurality of pixel values adjacent to the pixel hole to interpolate the pixel hole according to the pixel motion direction adopted in the motion image. For example, six pixel values are used in FIG. 5A and a partial block 502 of the motion image in FIG. 5B uses 9 pixel values. The motion image after the interpolation is the view image. The number of the pixel values for use may be obtained from design experience. In addition, the interpolation adopted in the present embodiment is not necessarily limited to the average interpolation or the median interpolation.

Figure 6A:
FIG. 6A to FIG. 6D are schematic views showing the result of an interpolation process.
Figure 6B:
Figure 6D:
Figure 6C:

FIG. 6A to FIG. 6D are schematic views illustrating the result of the interpolation process, wherein the motion image after the interpolation process is the view image. A motion image 601 in FIG. 6A includes a pixel hole 611. A view image 602 in FIG. 6B is obtained by performing conventional copy interpolation on the motion image 601, a view image 603 in FIG. 6C is obtained by performing the median interpolation on six pixel values of the motion image 601, and a view image 604 in FIG. 6D is obtained by performing the average interpolation on six pixel values of the motion image 601, wherein a position of a block 612 in the view image 602, a position of a block 613 in the view image 603, and a position of a block 614 in the view image 604 correspond to the position of the pixel hole 611 in the motion image 601. It can be seen from FIG. 6A to FIG. 6D that the view image 603 obtained by the median interpolation and the view image 604 obtained by the average interpolation appear to be smoother and more natural than the view image 602 obtained by the conventional copy interpolation.

According to the above interpolation, the first view image 404 in FIG. 4D is obtained by performing the average interpolation on six pixel values of the first motion image 403 in FIG. 4C while the second view image 406 in FIG. 4F is obtained by performing the average interpolation on six pixel values of the second motion image 405 in FIG. 4E.

Figure 7B:
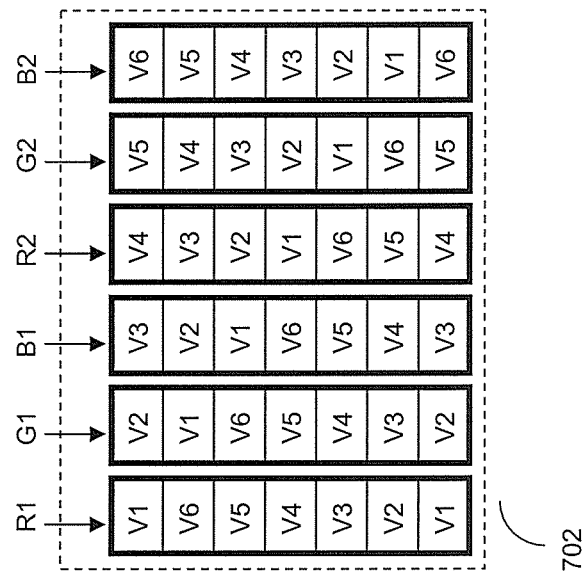
FIG. 7A to FIG. 7B are schematic views illustrating a synthesis process of an image transformation method according to one embodiment of the present invention.
Figure 7A:
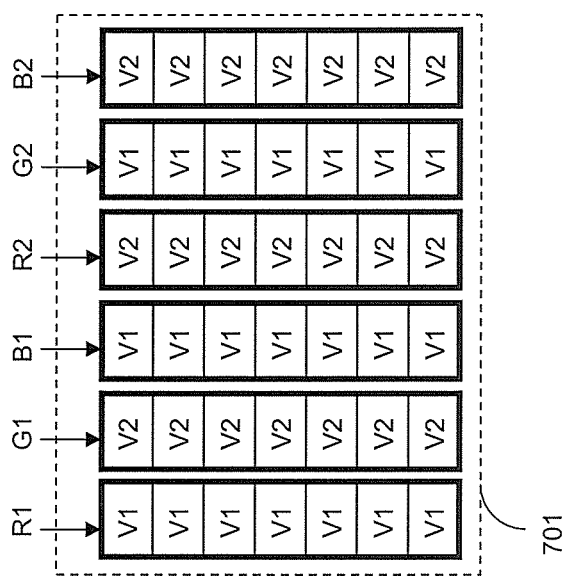

In step S304, the synthesis process is performed on the view images to obtain the 3D image, wherein the synthesis process is designed in accordance with the panel. FIG. 7A to FIG. 7B are schematic views illustrating a synthesis process of an image transformation method according to one embodiment of the present invention. FIG. 7A illustrates a partial block 701 of the panel (not shown), wherein the panel adopts two view images, red columns R1 and R2, green columns G1 and G2, and blue columns B1 and B2 represent individual columns of the partial block 701, synthesis points V1 represent pixel values to be filled at corresponding pixel positions in the first view image 404, and synthesis points V2 represent pixel values to be filled at corresponding pixel positions in the second view image 406. Specifically, the red column R1 sequentially fills pixel values at the corresponding positions in the first view image 404, the green column G1 sequentially fills pixel values at the corresponding positions in the second view image 406, the blue column B1 sequentially fills pixel values at the corresponding positions in the first view image 404, and so on. Furthermore, the above-mentioned synthesis process is performed on the motion images 403 and 405 to obtain a 3D image 407 in FIG. 4G.

Figure 8B:
FIG. 8A to FIG. 8M are schematic views showing the results of an image transformation method adopting six view images according to another embodiment of the present invention.
Figure 8A:
Figure 8D:
Figure 8C:
Figure 8F:
Figure 8E:
Figure 8H:
Figure 8G:
Figure 8J:
Figure 8I:
Figure 8L:
Figure 8K:

Based on the above image transformation method adopting two view images, embodiments of the present invention may also adopt six view images. FIG. 8A to FIG. 8M are schematic views showing the results of an image transformation method adopting six view images according to another embodiment of the present invention. According to the image transformation method of the present embodiment, in step S302, the depth image 402 and the gain values $GM_w$ are used to perform the motion process on the 2D image 401 and to obtain the motion images, wherein w in the gain value $GM_w$ may be assumed to be 1~6. Accordingly, the motion process is performed on the 2D image 401 according to the depth value D(i,j) of the depth image 402 and the gain value $GM_1$, i.e. according to the pixel motion value $S_1(i,j)=(D(i,j)/a)*GM_1$ to obtain the motion image in FIG. 8A, according to the pixel motion value $S_2(i,j)=(D(i,j)/a)*GM_2$ to obtain the motion image in FIG. 8C, according to the pixel motion value $S_3(i,j)=(D(i,j)/a)*GM_3$ to obtain the motion image in FIG. 8E, according to the pixel motion value $S_4(i,j)=(D(i,j)/a)*GM_4$ to obtain the motion image in FIG. 8G, according to the pixel motion value $S_5(i,j)=(D(i,j)/a)*GM_5$ to obtain the motion image in FIG. 8I, and according to the pixel motion value $S_6(i,j)=(D(i,j)/a)*GM_6$ to obtain the motion image in FIG. 8K.

On the other hand, according to the image transformation method of the present embodiment, subsequently in step S303, the interpolation process is performed on the above motion images to obtain the plurality view images. For example, the interpolation process may adopt the average interpolation on six pixel values. As such, the average interpolation of six pixel values is performed on the motion image of FIG. 8A to obtain the view image of FIG. 8B and the average interpolation is performed on the motion image of FIG. 8C to obtain the view image of FIG. 8D. Similarly, the view image of FIG. 8F corresponds to the motion image of FIG. 8E, the view image of FIG. 8H corresponds to the motion image of FIG. 8G, the view image of FIG. 8J corresponds to the motion image of FIG. 8I and the view image of FIG. 8L corresponds to the motion image of FIG. 8K.

Figure 8M:

According to the image transformation method of the present embodiment, subsequently in step S304, the synthesis process is performed on the view images to obtain the 3D image. In other words, the synthesis process is performed on the view images shown in FIGS. 8B, 8D, 8F, 8H, 8J, and 8L to obtain the 3D image shown in FIG. 8M. In detail, FIG. 7B illustrates a partial block 702 of the panel (not shown), wherein the panel adopts six view images. Red columns R1 and R2, green columns G1 and G2, and blue columns B1 and B2 represent individual columns of the partial block 702. Accordingly, in the synthesis process, synthesis points V1 represent pixel values to be filled at corresponding pixel positions in the view image of FIG. 8B, synthesis points V2 represent pixel values to be filled at corresponding pixel positions in the view image of FIG. 8D, synthesis points V3 represent pixel values to be filled at corresponding pixel positions in the view image of FIG. 8F, synthesis points V4 represent pixel values to be filled at corresponding pixel positions in the view image of FIG. 8H, synthesis points V5 represent pixel values to be filled at corresponding pixel positions in the view image of FIG. 8J, synthesis points V6 represent pixel values to be filled at corresponding pixel positions in the view image of FIG. 8L. According to the above synthesis process, the 3D image of FIG. 8M is obtained.

According to the above, the view images obtained in the embodiments of the present invention are smoother and more natural than the view images obtained by conventional interpolation. Moreover, the embodiments of the present invention also have the advantage of conserving memory usage. In a conventional process of making a 3D image, images or views suitable for the left and the right eyes are read from a memory and the two images are processed and outputted. According to descriptions in the above embodiments, a 2D image and a depth image are received from a memory and a motion process is used to obtain a plurality of motion images for subsequent processes. As such, when the panel adopts more view images, e.g. six view images, then six images suitable for the left eye and six images suitable for the right eye need to be read in the conventional method for making a 3D image for the subsequent synthesis process. Compared to the conventional technology, in the above embodiments, only a 2D image and a depth image need to be received from the memory and a motion process is used to obtain six motion images for subsequent processes. Then, interpolation is performed on the six motion images to obtain six view images, wherein when each view image is generated, data of each view image covers the corresponding motion image, thereby reducing memory usage. Moreover, in the above embodiments, the required memory space does not increase because the panel uses more view images.

According to the above, the present invention provides an image transformation method in which a 3D image is obtained according to a 2D image and a corresponding depth image. First, by using the depth image and a plurality of gain values, a motion process is performed on the 2D image to obtain a plurality of motion images. Subsequently, an interpolation process is performed on the motion images to thereby obtain a plurality of smooth and natural view images in addition to reducing memory usage. Finally, a synthesis process is performed on the view images to obtain a 3D image. The image transformation method of the present invention is applicable for image display devices, computer accessible recording media, computer program products, or embedded systems.

Although the present invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. An image transformation method, for an image display device, the method comprising:
    obtaining a 2 dimensional (2D) image and a corresponding depth image;
    according to the depth image and N gain values GMW, performing a motion process on the 2D image to obtain N motion images, wherein a pixel motion value in each of the motion images varies with the corresponding gain value GMW, N and w are positive integers, and $1 \leq w \leq N$;
    respectively performing an interpolation process on the motion images to obtain a plurality of corresponding view images; and
    performing a synthesis process on the view images to obtain a 3D image,
    wherein a formula used in performing the motion process to calculate the pixel motion values in the motion images is as follows:
    $Sw(i,j)=(D(i,j)/a)*GMw$,
    wherein $Sw(i,j)$ represents the pixel motion value of the wth motion image, (i,j) represents coordinates of a pixel at the ith column and jth row in the wth motion image, $D(i,j)$ represents a pixel value of the depth image, a is a constant, and i and j are positive integers.

2. The image transformation method according to claim 1, wherein the constant a is an integer greater than zero.

3. The image transformation method according to claim 1, wherein the motion images are obtained by moving pixel positions in the 2D image according to the corresponding pixel motion value $Sw(i,j)$.

4. The image transformation method according to claim 3, wherein the pixel motion value $Sw(i,j)$ represents an amount of motion of the pixel to the left or the right.

5. The image transformation method according to claim 1, wherein the step of respectively performing the interpolation process on the motion images to obtain the corresponding view images comprises:
    selecting an average of a plurality of pixel values adjacent to a pixel hole to interpolate the pixel hole according to a motion direction of the pixels in each of the motion images.

6. The image transformation method according to claim 1, wherein the step of respectively performing the interpolation process on the motion images to obtain the corresponding view images comprises:
    selecting a median of a plurality of pixel values adjacent to a pixel hole to interpolate the pixel hole according to a motion direction of the pixels in each of the motion images.

7. The image transformation method according to claim 1, wherein the step of performing the synthesis process on the view images to obtain the 3D image comprises:
    displaying the view images on the image display device according to pixel positions corresponding to the view images.

* * * * *